(12) United States Patent
Wojciechowski

(10) Patent No.: US 7,239,379 B2
(45) Date of Patent: Jul. 3, 2007

(54) METHOD AND APPARATUS FOR DETERMINING A VERTICAL INTENSITY PROFILE THROUGH A PLANE OF FOCUS IN A CONFOCAL MICROSCOPE

(75) Inventor: Joel C. Wojciechowski, New York, NY (US)

(73) Assignee: Technology Innovations, LLC, New York, NY (US)

( * ) Notice: Subject to any disclaimer, the term of this patent is extended or adjusted under 35 U.S.C. 154(b) by 0 days.

(21) Appl. No.: 11/224,621

(22) Filed: Sep. 12, 2005

(65) Prior Publication Data

US 2006/0055914 A1   Mar. 16, 2006

Related U.S. Application Data

(60) Provisional application No. 60/608,894, filed on Sep. 13, 2004.

(51) Int. Cl.
*J01J 1/00* (2006.01)
(52) U.S. Cl. ...................................... 356/121
(58) Field of Classification Search ........ 356/121–123, 356/213–218, 399, 424, 427–428; 359/642
See application file for complete search history.

(56) References Cited

U.S. PATENT DOCUMENTS

| | | | | |
|---|---|---|---|---|
| 3,598,493 | A * | 8/1971 | Fisher | 250/231.16 |
| 3,748,975 | A * | 7/1973 | Tarabocchia | 396/548 |
| 4,172,639 | A * | 10/1979 | Lang et al. | 351/211 |
| 4,172,662 | A * | 10/1979 | Vogel | 356/248 |
| 6,778,323 | B2 | 8/2004 | Endo et al. | |
| 6,847,490 | B1 * | 1/2005 | Modell et al. | 359/642 |
| 7,042,556 | B1 * | 5/2006 | Sun | 356/4.07 |

OTHER PUBLICATIONS

Multiple Excitation Microscopy, MPE Tutorial, Coherent Laser Group, Copyright 2000 Coherent, Inc. MC-SC14-2000-3M0500.
How does a comfocal microscope work?, http://www.physics,emory.edu/-weeks/confocal/. Jan. 11, 2006.

(Continued)

*Primary Examiner*—Hoa Q. Pham
(74) *Attorney, Agent, or Firm*—Brian B. Shaw, Esq.; Stephen B. Salai, Esq.; Harter Secrest & Emery LLP

(57) ABSTRACT

An assembly is provided for the direct measurement of a vertical intensity profile through a plane of focus of a confocal microscope, a determination of a depth of the confocal plane and a maximum intensity of the intensity profile. The assembly includes a transparent substrate in which is embedded a scale having a graduated length, wherein the scale is inclined relative to a local portion of an illuminating beam on an illuminating path of the confocal microscope. The graduated scale is configured to be illuminated with an intensity corresponding to the position within the plane of focus along the axis of the illuminating beam. The inclination of the scale and the path of the illuminating beam are at a predetermined angle. The graduated scale can be fluorescently dyed to illuminate with an absorption frequency relevant to a light source or illuminating beam of the confocal microscope. An algorithm employing trigonometric functions and calculating the confocal plane depth of the specimen is disclosed.

12 Claims, 7 Drawing Sheets

OTHER PUBLICATIONS

Laser Scanning Confocal Microscopy, Molecular Expressions Microscopy Primer: Specialized Microscopy Techniques-Confocal Microscopy, http://microscopy.fsu.edu/primer/techniques/confocal/index.html, Nov. 10, 2005.

* cited by examiner

METHOD AND APPARATUS FOR DETERMINING A VERTICAL INTENSITY PROFILE THROUGH A PLANE OF FOCUS IN A CONFOCAL MICROSCOPE

CROSS-REFERENCE TO RELATED APPLICATIONS

The present application claims the benefit of U.S. application No. 60/608,894 filed Sep. 13, 2004, the disclosure of which is hereby expressly incorporated by reference.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention is generally related to confocal microscopy and, more particularly, to an apparatus and method for the direct measurement of a variable vertical intensity profile through a plane of focus of the confocal microscope and hence a determination of a depth of the confocal plane and a maximum intensity of the intensity profile.

2. Description of Related Art

There are a multitude of applications where it is desirable to measure properties of a sample via a confocal microscope. The roughness of a surface, the curvature of the surface and the height of 'steps' on the surface are typical applications for a confocal microscope. In biomedical research, there is tremendous growth in the use of confocal microscopy. However, there is a need in the art for a more precise means to aid in determining the distance between the cells in a tissue, or organelles in a cell being observed using the confocal microscope.

Another rapidly growing area in the semiconductor industry, is the use of 'bumps' or other three dimensional features that protrude outwardly from the wafer or substrate. The manufacturers, processors, and users of such wafers or like substrates having bumps or other three dimensional features desire to inspect these wafers or like substrates in the same or similar manner to the two dimensional substrates. The manufacturers of semiconductors have made vast improvements in end-product quality, speed and performance as well as in manufacturing process quality, speed and performance. However, there continues to be a demand for faster, more reliable and higher performing semiconductors. However, many obstacles exist, such as a significant height of bumps or the like, which causes focusing problems, shadowing problems, and general depth perception problems. Many of the current systems, devices, apparatus and methods are either completely insufficient to handle those problems or cannot satisfy the speed, accuracy, and other requirements.

Thus, an unaddressed need exists in the art to overcome the aforementioned deficiencies and inadequacies.

BRIEF SUMMARY OF THE INVENTION

The present invention provides a determination of a variable intensity profile through a confocal plane, as well as a direct method of measurement, thereby offering the observer valuable information about the microscopic system. One configuration of the present invention can provide (1) measuring the performance of a confocal microscope, (2) comparing performance between different confocal microscopic systems, and (3) increasing quantitative resolution of three-dimensional constructions using the confocal microscope.

The present invention directly measures a vertical intensity profile of a focal plane (confocal slice) on a confocal microscope. From this measurement, a determination of a depth of the confocal slice can be made.

The present invention encompasses a transparent substrate having an embedded vertical scale (such as a micrometer) offset (inclined) at a precise angle with respect to the z-axis. Observation of the scale yields a direct visualization of the variable intensity profile through the plane of focus (confocal plane), providing valuable information including a depth of the confocal plane, a maximal intensity, and shape of the intensity profile.

Embodiments of the present invention provide an apparatus and method for measuring the depth of field or a depth of the confocal slice of a specimen on a confocal microscope.

In a further configuration, the apparatus includes a transparent substrate such as a glass microscope slide in which is imbedded a graduated length of a ruler or distance meter (scale) that is offset at an angle to an illuminating beam passing through the substrate. The distance meter or length of a graduated ruler (scale) can be painted, dyed such as fluorescently dyed or of a material to illuminate within an absorption frequency relevant to the illuminating beam (the light source of the microscope). The depth of field or the depth of the confocal slice can be obtained by reading the change in the Z direction on the graduated scale.

Determination of the depth of the confocal plane (confocal slice) of the microscope, and hence of a specimen, uses an algorithm employing trigonometric functions resulting in measurement of the confocal depth in the Z direction.

Other systems, methods, features, and advantages of the present invention will become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE SEVERAL VIEWS OF THE DRAWING(S)

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
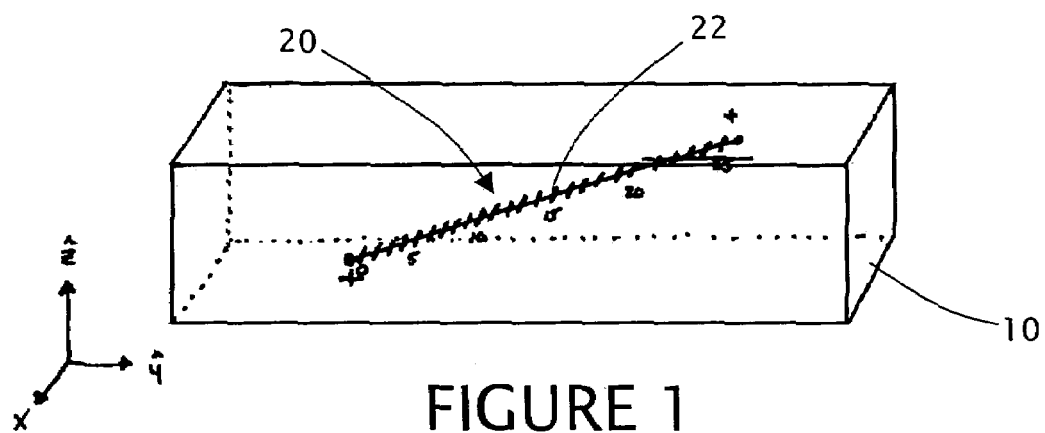
FIG. 1 is a perspective view of an embodiment of the invention.

Referring to FIG. 1, the present assembly includes a transparent substrate 10 and a graduated length of ruler, a distance meter or scale 20.

In one configuration, the invention is disposed in the optical path of a confocal microscope. As is known in the art, the confocal microscope typically uses a Nipkow disc or a laser to produce point-probing raster scanning, yielding images of a specimen (or the present assembly) with very high contrast in the third dimension. A small aperture at the secondary focus of the objective lens narrows the depth of focus and obstructs most of the light reflected from out-of-focus object. Thus, the microscope includes an illuminating beam, such as a coherent beam or laser. The illuminating being travels along an illuminating axis. The illuminating axis is typically formed of a plurality of linear segments. It is understood the confocal microscope encompasses a variety of microscope technologies including but not limited to two-photon or multiphoton microscopes. U.S. Pat. No. 6,909,542 issuing June 21, 20 to Sasaki and U.S. Pat. No. 3,013,467 to Minsky are hereby incorporated by reference.

Figure 5:
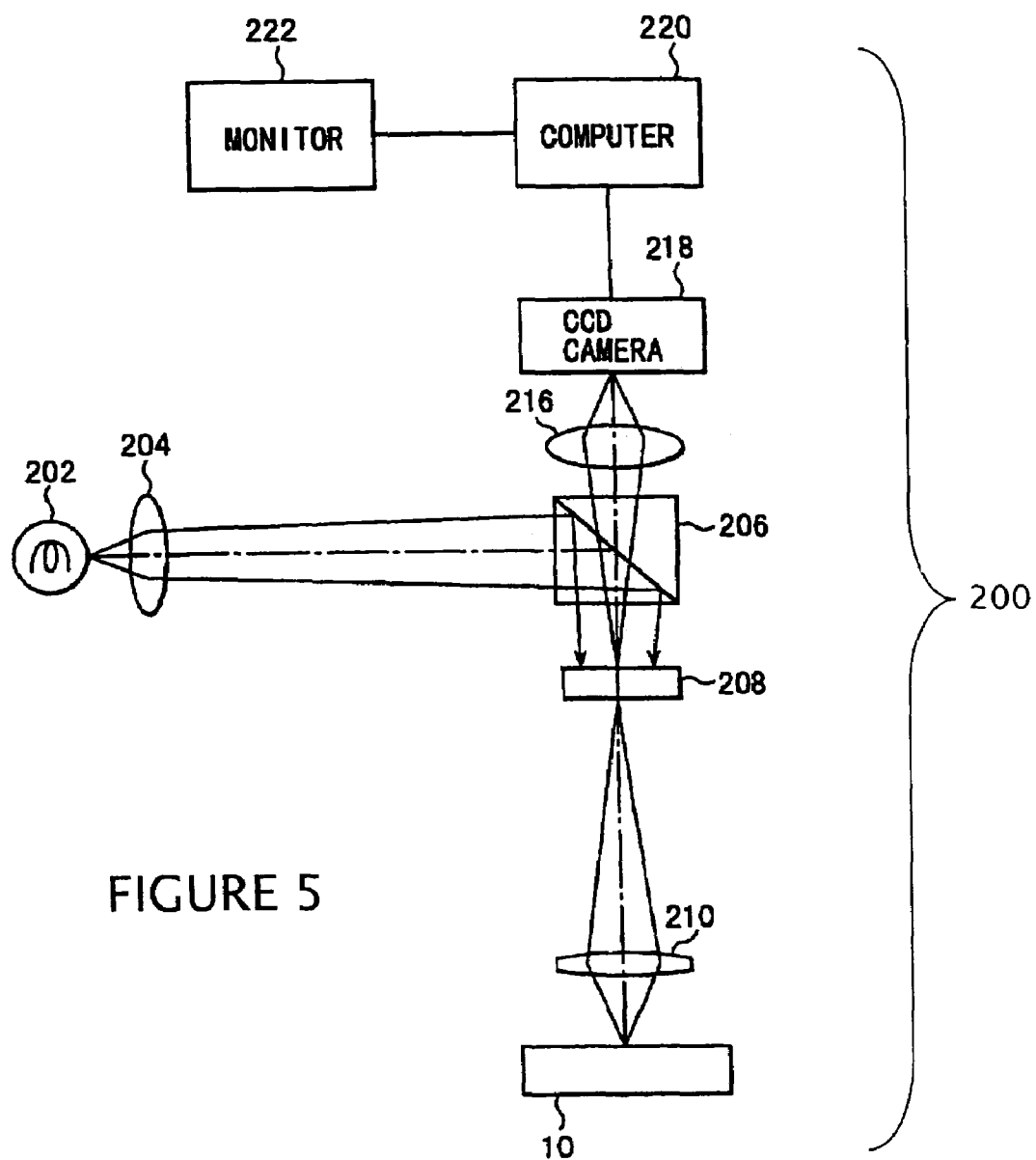
FIG. 5 is representative confocal microscope incorporating the present invention.
Figure 6:
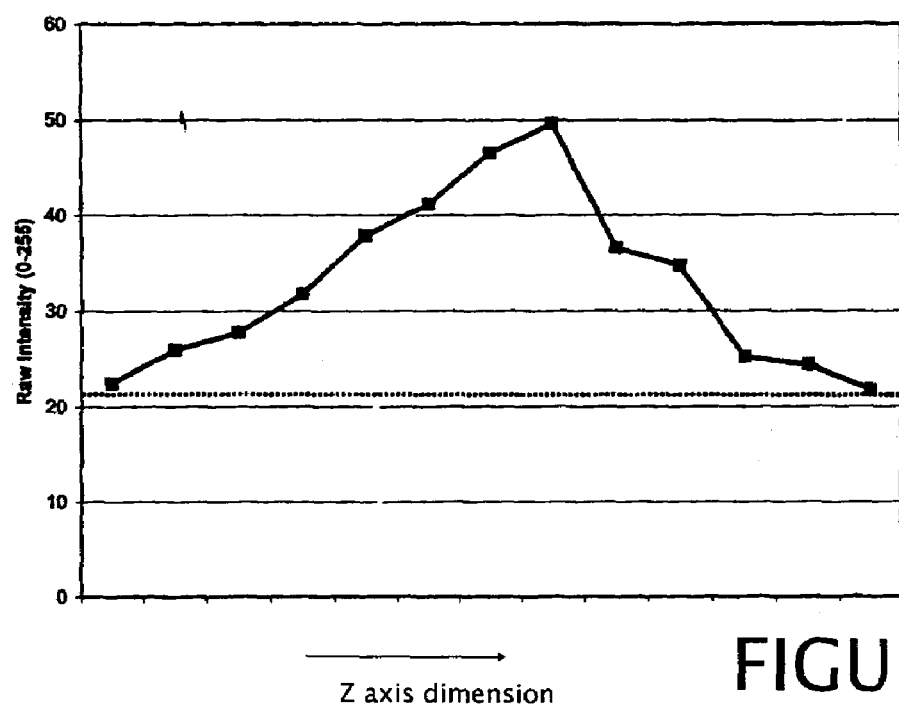
FIG. 6 is a representative intensity profile for a given assembly and location.
Figure 7:
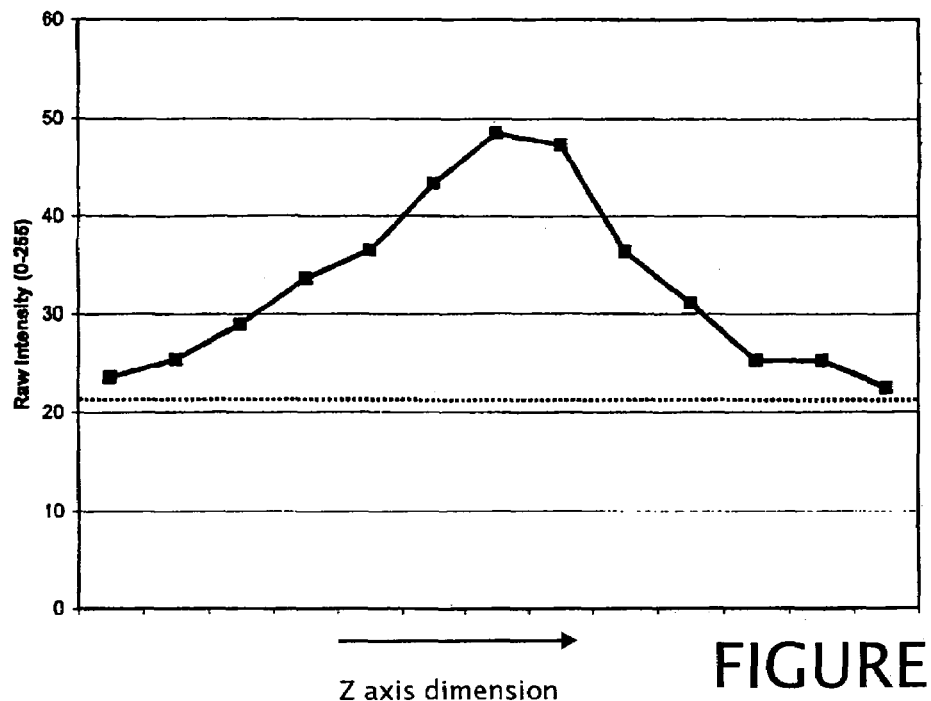
FIG. 7 is a further representative intensity profile for a given assembly and location.
Figure 8:
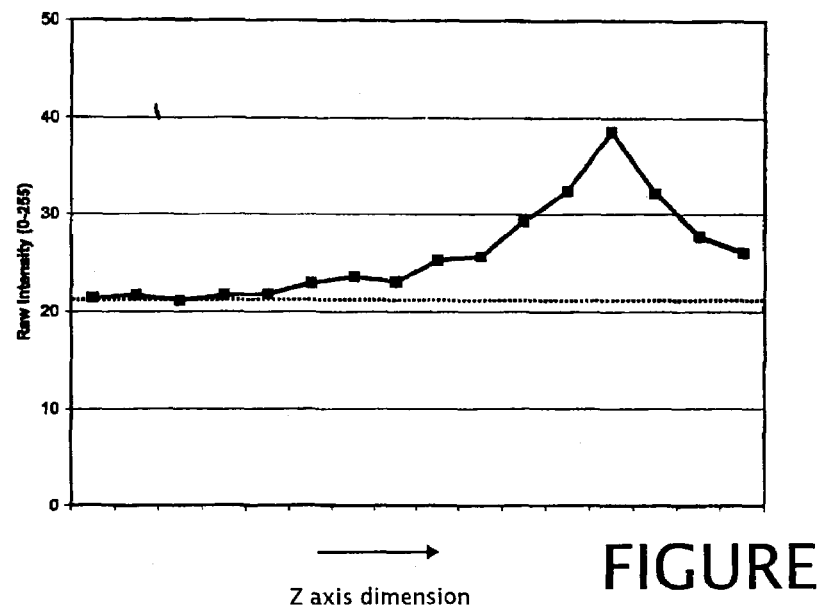
FIG. 8 is another representative intensity profile for a given assembly and location.
Figure 9:
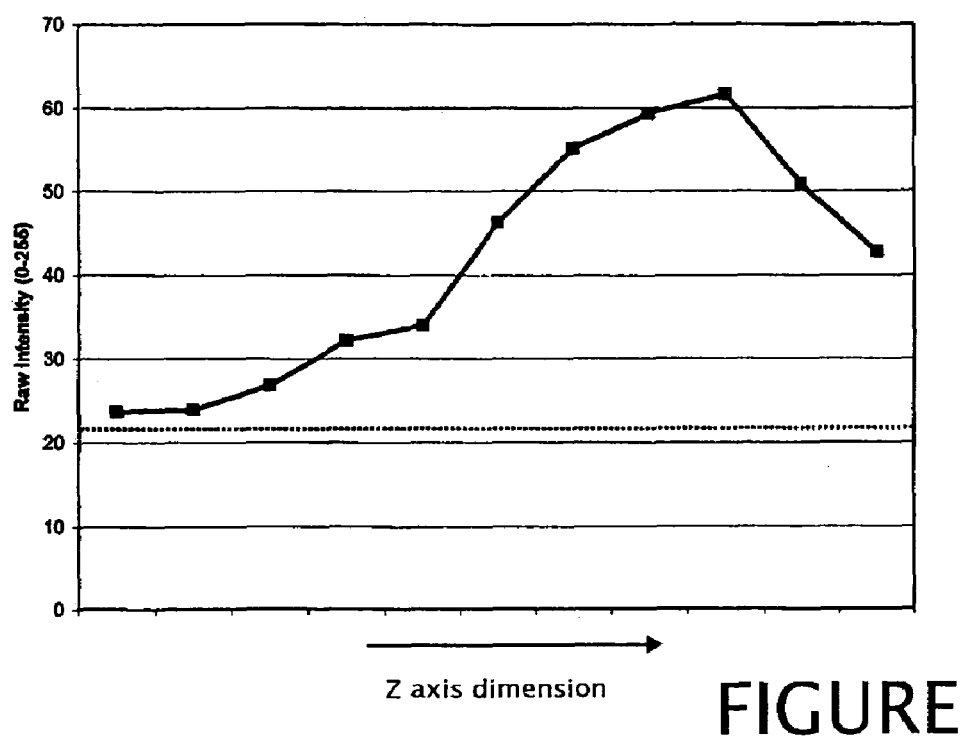
FIG. 9 is an additional representative intensity profile for a given assembly and location.

Specifically, referring to FIG. 5, a representative confocal microscope 200 includes an optical lens 204 and half mirror 206 arranged on the optical path of a beam of light (illuminating beam) emitted from a light source 202. The light source 202 can be a halogen light source, a mercury light source, a solid state light source such as a light emitting diode or a coherent light source. A pinhole 208, an objective lens 210 and the substrate 10 (with the scale 20) are arranged on the optical path (axis) of the light beam reflected by the half mirror 206. The illuminating beam reflected by the scale 20 in the substrate 10 is made to enter a CCD camera 218 through the objective lens 210, the pinhole 208, the half mirror 206 and a condenser lens 216. The images output from the CCD camera 218 are stored in a computer 220.

The transparent substrate 10 which incorporates the scale 20 can be any of a variety of substrates, wherein the substrate can have a planar surface or a pair of parallel planar surfaces orthogonal to the illumination path (the illuminating beam) of the confocal microscope. The transparent substrate 10 is transparent to the respective illuminating beam of the confocal microscope or a separate sensing beam used in conjunction with the scale 20. A typical transparent substrate 10 is a glass microscope slide. However, it is understood the transparent substrate 10 can be any of a variety of optically transparent materials, including glasses, fused silicas or borosilicas, plastics, gels and even contained thixotropic materials.

In the microscope slide configuration, the index of refraction of the transparent substrate 10 is approximately identical to that of the specimen previously or subsequently imaged in the microscope. The proximity of the index of refraction of the transparent slide to the index of refraction of the specimen enhances the accuracy of the resulting measurements and the estimation of the depth of field. It is further contemplated that the transparent substrate 10 has a similar index of refraction and absorption coefficient as the specimen. It is advantageous for the index of refraction of the transparent substrate 10 to be within approximately 25% of the index of refraction of the specimen, and more advantageously to be within 10% and even with 5%, to less than 2%.

The scale 20 includes a plurality of spaced indicia or markings 22 extending along a longitudinal dimension in a given plane. In one construction, the markings are equally spaced along the scale 20. The scale 20 is fixed relative to the transparent substrate 10 so as to be non-perpendicular to an intersecting portion of the illuminating beam (optical path) by an offset angle $\theta$. Typically, the plane in which the scale 20 lies is non-orthogonal to the z axis. Thus, the scale 20 is inclined relative to the local portion of the illuminating beam (illuminating axis) of the confocal microscope. It is understood the scale 20 can be a linear element which intersects the illuminating beam (illuminating axis), however the scale can be a curvilinear element which locates markings 22 at different positions relative to the z-axis (the illuminating beam). Thus, the scale 20 locates the markings 22 at differing positions relative to the z-axis. In one configuration, the scale 20 is embedded within the transparent substrate 10. That is, the scale 20 is entirely within the material of the transparent substrate 10. However, it is understood a portion of the scale 20 can be disposed at or adjacent a surface of the transparent substrate 10.

It has been found advantageous for the offset angle $\theta$ to be a predetermined or known angle. However, it is understood the offset angle $\theta$ can be measured or determined subsequent to fixing the scale 20 relative to the transparent substrate 10.

The scale 20 is advantageously illuminated by the illuminating beam or a separate sensing beam. That is, the visibility or readability of the scale 20 corresponds to the energy received from the illuminating beam, and the energy received from the illuminating beam corresponds to the location within the confocal plane. In one configuration, the scale 20 is fluorescently dyed to illuminate with an absorption frequency corresponding to the microscope light source.

Figure 2:
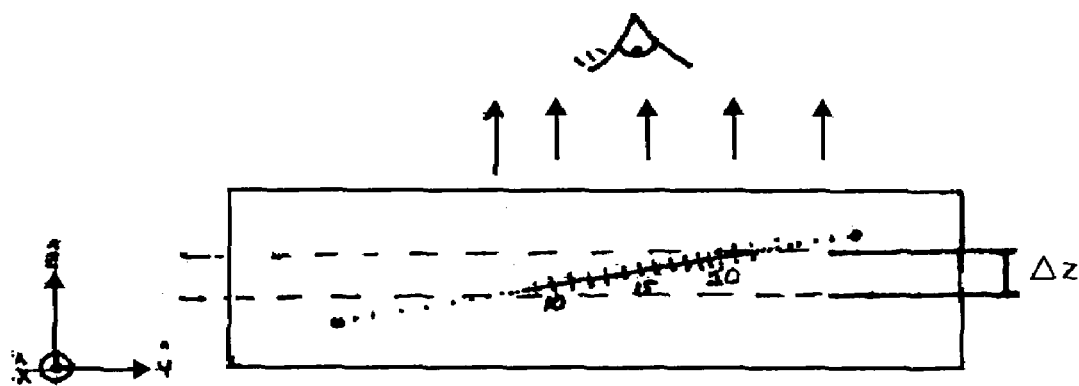
FIG. 2 is a view along the x-axis of the embodiment illustrated in FIG. 1.

As seen in FIG. 2, only a portion of the scale 20 is shown as illuminated by the illuminating beam. That is, only a portion of the scale 20 is within the depth of field (focal plane) of the confocal microscope. In FIG. 2, the light rays pass upward to the objective of the confocal microscope. As seen in FIG. 2, $\Delta z$ corresponds to the depth of field (the depth of the confocal slice) or the dimension of the confocal plane along the z-axis.

Figure 3:
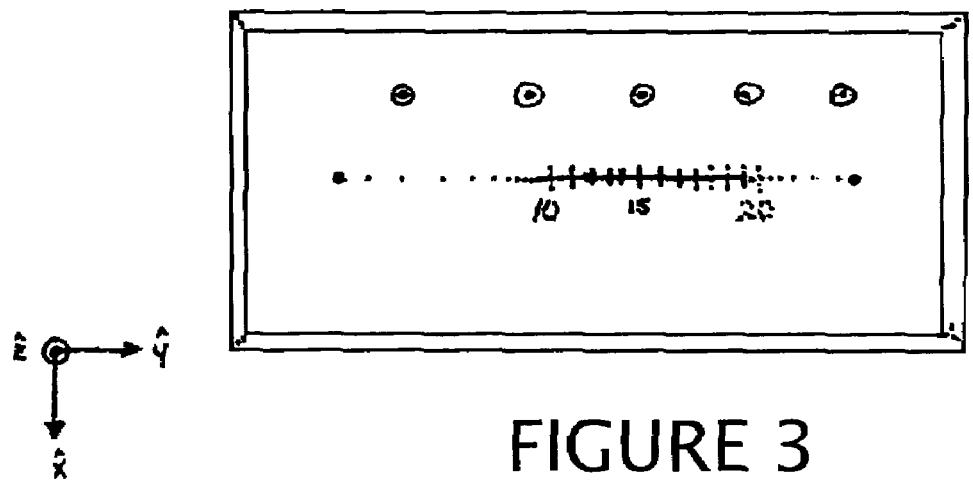
FIG. 3 is a view along the z-axis of the embodiment illustrated in FIG. 1.

Referring to FIG. 3, the light rays to the objective extend upwards out of the page. FIG. 3 is representative of the image of the present apparatus as operably located within the illuminating beam along the illuminating path. The intensity profile from which the depth of field is determined is obtained by reading the illuminated range of the scale 20.

The transparent substrate 10 is positioned in a plane orthogonal to the intersecting portion of the illuminating beam. As previously stated, the depth of field or the change in the Z direction is obtained by reading the gradations of the scale 20.

Generally, the scale 20 remains stationary (fixed) relative to the transparent substrate 10, and hence relative to the confocal plane. The scale 20 glows or emits light at various intensities along the length of the scale, the intensity being dependent upon where the respective portion of the scale lies within the confocal plane—or conversely where the confocal plane lies relative to the fixed scale 20. Thus, an intensity profile or distribution is created from the scale 20.

From the intensity distribution along the scale 20, the present invention further provides for the determination of the depth of the confocal slice (the dimension of the confocal plane along the z-axis).

The intensity profile from the illuminated scale 20 can be read and recorded by any of a variety of mechanisms, such as but not limited to optical sensors, charge-coupled devices 218, films, light sensors or the like.

Figure 4:
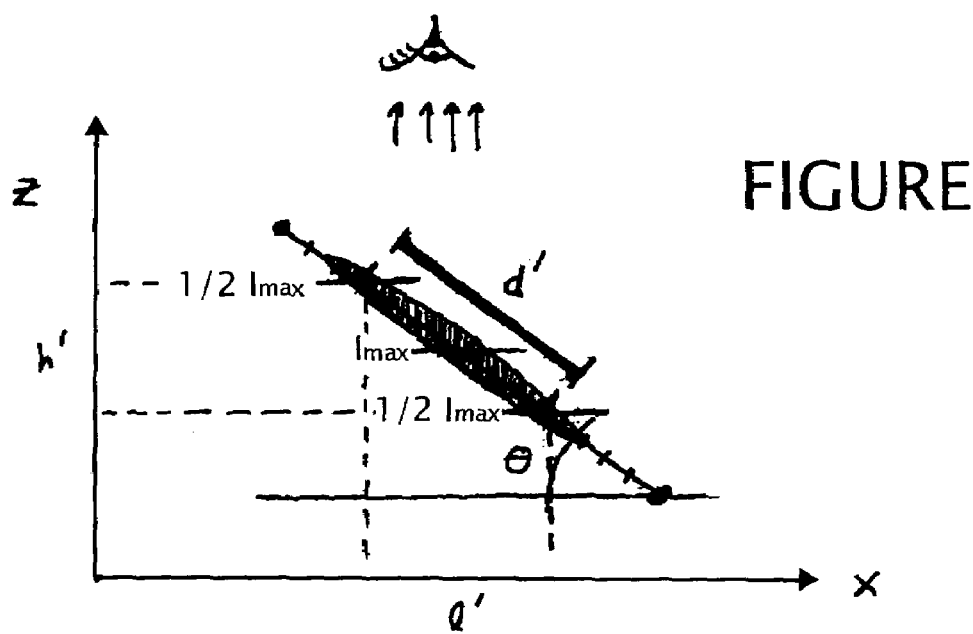
FIG. 4 is a schematic cross section for determining a confocal depth.

A preferred method for determining the dimension of the confocal plane along the z-axis (the confocal slice or confocal depth) of the microscope (and thus the specimen) uses the following algorithm and the diagram as illustrated in FIG. 4:

$l' = d' \cos \theta$; then
$d' = l' \cos \theta$.
From FIG. 4, $h' = d' \sin \theta$
substituting for d' then
$h' = (l'/\cos \theta) \sin \theta$
$h' = l' (\sin \theta / \cos \theta)$, which can be rewritten as:
$h' = l' \tan \theta$, where l' is the observed distance by an observer along the z-axis, d' is the actual distance along the scale 20 and h' is the actual dimension of the defined confocal plane along the z-axis.

Using the algorithm, the pixels in a two-dimensional region of interest are scanned. The $I_{max}$ intensity is determined as well as a baseline intensity. The range is equal to the determined $I_{max}$ minus the baseline (minimal) intensity ($I_{max} - I_{min}$). One-half of the range is then determined. Next, the pixel distance is determined, converted to micrometers and multiplied by two in order to get the full confocal dimension along the z-axis (depth). Such full confocal depth is the l' designated in FIG. 4. l' is then multiplied by the tangent of the angle θ as designated in FIG. 4 to determine the true confocal depth, h'.

However, it is understood that alternative definitions of the depth of the confocal plane can be employed. That is, the present description is based on a definition of the confocal plane being twice the distance from half the intensity maximum to the intensity maximum ($I_{max}$), i.e. from half the $I_{max}$x on one side of the intensity profile to the other half $I_{max}$ on the other side. Alternative definitions of the confocal plane can be employed, such as from 10% of the $I_{max}$ to 90%, or 20% of the $I_{max}$ to 80% up to 40% of the $I_{max}$ to 60%. Referring to FIGS. 6, 7, 8 and 9, representative intensity profiles along the z-axis at a given point (X,Y) for a given assembly or specimen are shown. In accordance with the preceding algorithm, the dimension of the confocal plane along the z-axis can be determined from the corresponding intensity profile.

It is further contemplated the intensity profile may not be symmetrical intensity profile about $I_{max}$. The symmetry of the intensity profile can be assessed by comparing one half of $I_{max}$ about each side of $I_{max}$. In such instance, the respective portion of the intensity profile can be weighted or compensated, as dictated by the nonlinearity and the desired degree of accuracy.

In use, the assembly of the transparent substrate 10 with the embedded scale 20 is operably located in the confocal microscope before and/or after a specimen is operably located and imaged by the confocal microscope. For example, the given specimen is imaged by the confocal microscope 200, subsequently the assembly of the transparent substrate 10 with the embedded scale 20 is located in the path of the illuminating beam (in place of the specimen), the scale is then illuminated and the resulting intensity profile is measured or recorded.

The present system allows for a relatively rapid determination of the illumination intensity profile of the confocal plane in the confocal microscope (and hence dimension of the confocal plane along the z-axis) with no dependency upon movement through the confocal plane or the mechanics of a movable transparent substrate 10, such as the microscope stage.

It should be emphasized that the above described embodiments of the present invention, particularly, any preferred embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. An apparatus for use in measuring an intensity profile along a confocal plane in a confocal microscope, comprising:
   (a) a transparent substrate in an illuminating beam of a confocal microscope; and
   (b) a graduated scale embedded in the transparent substrate, the graduated scale offset from the illuminating beam by a predetermined angle.

2. The apparatus of claim 1, wherein the transparent substrate is a glass microscope slide.

3. The apparatus of claim 1, wherein the transparent substrate is a gel.

4. The apparatus of claim 1, wherein the graduated scale is fluorescently dyed.

5. The apparatus of claim 4, wherein the fluorescent dye fluoresces in response to the illuminating beam of the confocal microscope.

6. The apparatus of claim 1, further comprising a detector for sensing the intensity profile of an illuminated portion of the graduated scale.

7. A method for use in determining an intensity profile of a confocal plane in a confocal microscope, the method comprising:
   (a) locating a graduated scale embedded in a transparent substrate in an illuminating beam of the confocal microscope, the graduated scale inclined with respect to the illuminating beam; and
   (b) measuring an intensity profile of the illuminated graduated scale.

8. The method of claim 7, further comprising fluorescing the illuminated graduated scale.

9. The method of claim 8, further comprising calculating a dimension of a confocal plane along an axis of the illuminating beam corresponding to the two-dimensional length.

10. The method of claim 7, further comprising determining a two dimensional length of the graduated scale as viewed through the transparent substrate.

11. The method of claim 7, further comprising determining a dimension of a confocal plane along an axis of the illuminating beam corresponding the relation $h' = l \tan \theta$, where h' is the dimension of a confocal plane along the illuminating path, l' is the observed dimension of the illuminated scale and θ is the offset angle between the illuminating path and the scale.

12. A method for use in determining an intensity profile of a confocal plane in a confocal microscope, the method comprising:

(a) determining a two dimensional length of the scale as viewed through a transparent substrate, wherein a graduated scale is embedded in the transparent substrate at an offset angle to an illuminating beam; and (b) calculating the confocal depth corresponding to the two-dimensional length.

* * * * *